(12) United States Patent
Fukushima et al.

(10) Patent No.: US 6,411,216 B1
(45) Date of Patent: Jun. 25, 2002

(54) DISPLAY DEVICE WITH INDICATORS HAVING INCREASED BRIGHTNESS

(75) Inventors: Kazuo Fukushima; Keiichi Nagano; Osamu Shima; Mitsugu Kobayashi; Masatoshi Azuma, all of Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/622,578

(22) PCT Filed: Jan. 17, 2000

(86) PCT No.: PCT/JP00/00178

§ 371 (c)(1),
(2), (4) Date: Aug. 21, 2000

(87) PCT Pub. No.: WO00/43978

PCT Pub. Date: Jul. 27, 2000

(30) Foreign Application Priority Data

Jan. 25, 1999 (JP) .............................................. 11-016254
Jan. 29, 1999 (JP) .............................................. 11-020882

(51) Int. Cl.$^7$ ................................................. G08B 5/00
(52) U.S. Cl. ................... 340/815.4; 340/461; 340/459; 359/630
(58) Field of Search ........................ 340/815.4, 815.45, 340/815.78, 459, 462, 525, 461; 362/489; 359/630

(56) References Cited

U.S. PATENT DOCUMENTS

| | | | | |
|---|---|---|---|---|
| 4,025,896 A | * | 5/1977 | Hintze et al. ................ | 362/253 |
| 4,464,933 A | * | 8/1984 | Santis ........................ | 73/866.3 |
| 4,954,807 A | * | 9/1990 | Fleischer et al. ............ | 340/459 |
| 5,013,135 A | * | 5/1991 | Yamamura ................... | 359/630 |
| 5,440,428 A | * | 8/1995 | Hegg et al. ................. | 359/630 |
| 5,578,985 A | * | 11/1996 | Cremers et al. ............ | 340/461 |
| 5,821,867 A | * | 10/1998 | Angell et al. ............. | 340/815.4 |

FOREIGN PATENT DOCUMENTS

| | | |
|---|---|---|
| JP | 63-188184 | 8/1988 |
| JP | 2-164637 | 6/1990 |
| JP | 10-91087 | 4/1998 |

* cited by examiner

Primary Examiner—John Tweel
(74) Attorney, Agent, or Firm—McDermott, Will & Emery

(57) ABSTRACT

A first indicator has a display board, a pointer to point the display board, a light source to subject the display board to transmitted illumination, and pointer driving means to drive the pointer. A housing stores the first indicator, a second indicator formed of a first light emitting type indicator, and a third indicator formed of a second light emitting type indicator. The viewer sees the second indicator reflected upon a semi-transmitting reflection board, the third indicator through the semi-transmitting refection board, and the first indicator not through the semi-transmitting reflection board.

13 Claims, 4 Drawing Sheets

DISPLAY DEVICE WITH INDICATORS HAVING INCREASED BRIGHTNESS

This Application is a 371 of Application PCT/JP00/00178, dated Jan. 17, 2000.

FIELD OF THE INVENTION

The present invention relates to a display device including a plurality of indicators.

BACKGROUND ART

As shown in FIG. 4, there is a display device for vehicle which stores in a housing 1, indicating instruments 2 (indicators) such as a speedometer and a tachometer, and a light emitting type indicator 3 (indicator) such as a fluorescent character display tube. The display board 4 for the indicating instruments 2 has a light shielding portion printed in black for example except for an indicator portion (scales and numbers) in a translucent substrate, and a pointer 5 points a scale to indicate the speed of a vehicle or the engine speed. A light source 6 such as a bulb is provided at the back of the display board 4, and the light source 6 is directed to the indicator portion in the display board 4 for transmitted illumination. A light source such as an LED (Light Emitting Diode) is provided at the base of the pointer 5 and a pointing portion 5a emits light. There is a semi-transmitting cover 7 in the front of the housing 1 to protect the indicators 2 and 3. There is a semi-transmitting reflection board 8 between the indicating instrument 2 and the cover 7, and the indication light L of the light emitting type indicator 3 is reflected upon the semi-transmitting reflection board 8 to reach the viewer. The light emitting type indicator 3 indicates the time in numerical digits, and the viewer can see the virtual image 9 of the time indication with the eye at a distance approximately the same as that to the display board 4. Note however that since the transmittance of the semi-transmitting reflection board 8 is about 50%, and the transmittance of the cover 7 is about 20%, the indicating instruments 2 looks dim. More specifically, the light of the indicating instruments 2 (the light of the pointing portion 5a and the indicator portion at the display board 4) is reduced to about 10% as it is transmitted through the semi-transmitting reflection board 8 and the cover 7.

According to the present invention, a display device capable of indicating a virtual image and preventing the brightness of the indicators (indicating instruments) from being extremely lowered is provided.

DISCLOSURE OF THE INVENTION

An indicating instrument (first indicator 15) includes a display board 21, a pointer 24 to point the display board 21, a light source 22 to subject the display board 21 to transmitted illumination, and pointer driving means 25 to drive the pointer 24. A housing 10 stores the first indicator 15, a second indicator 17 formed of a first light emitting type indicator, and a third indicator 16 formed of a second light emitting type indicator.

First indication light L1 projected by the second indicator 17 is reflected upon a semi-transmitting reflection board 20 to reach the viewer. Second indication light L2 projected by the third indicator 16 is transmitted through the semi-transmitting reflection board 20 to reach the viewer. Light by the first indicator 15 reaches the viewer without being transmitted through the semi-transmitting reflection board 20. In other words, the display device has such a structure that the viewer views the second indicator 17 reflected upon the semi-transmitting reflection board 20, the third indicator 16 through the semi-transmitting reflection board 20, and the first indicator 15 not through the semi-transmitting reflection board 20.

BEST MODE FOR CARRYING OUT THE INVENTION

Figure 1:
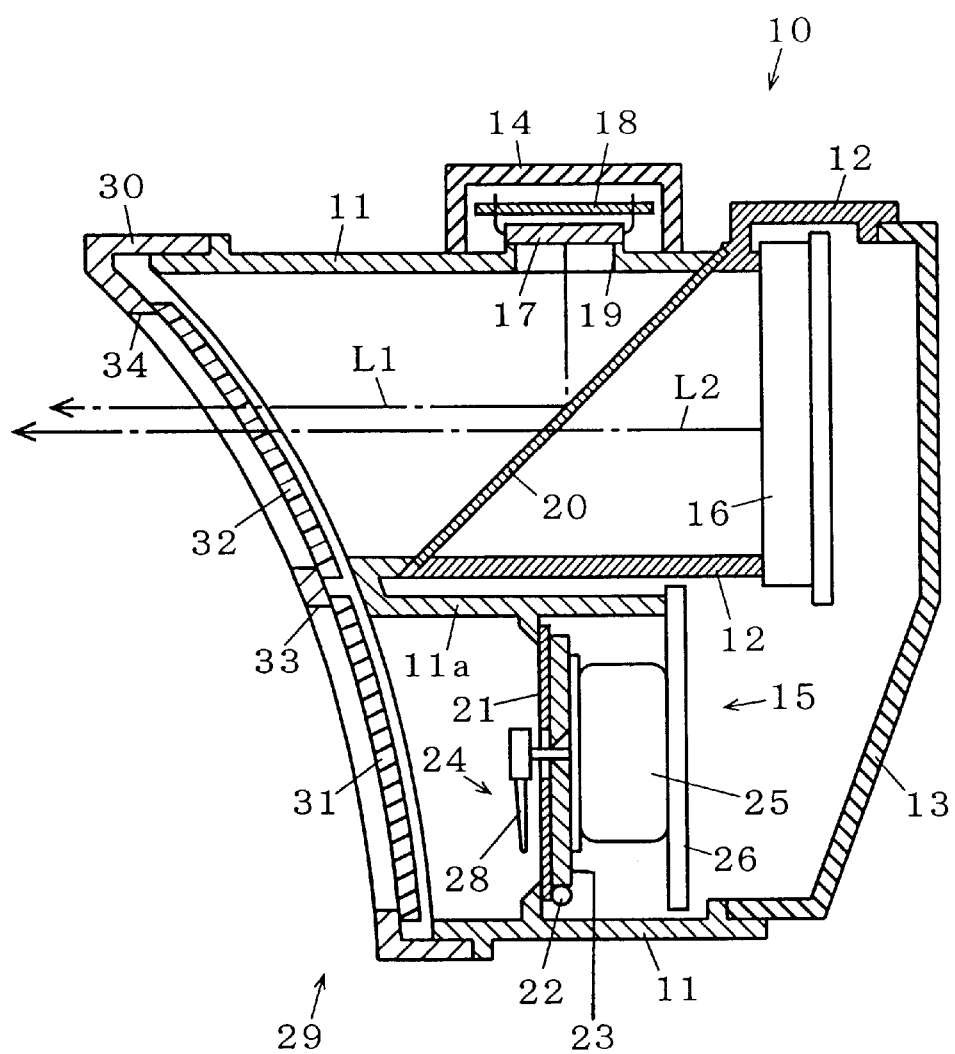
FIG. 1 is a cross sectional view of a display device according to an embodiment of the present invention.

One embodiment of the present invention applied to a display device for vehicle will be now described in conjunction with the accompanying drawings.

Reference numeral 10 represents a housing having a front side housing portion 11, a rear side housing portion 12, a rear side cover 13 and an upper side cover 14. The housing 10 stores four indicating instruments 15 (first indicators), i.e., a speedometer 15a, a fuel meter 15b, a water temperature meter 15c, and a tachometer 15d. The speedometer 15a and the tachometer 15d are larger than the fuel meter 15b and the water temperature meter 15c, and the fuel meter 15b and the water temperature meter 15c are provided between the speedometer 15a and the tachometer 15d.

The housing 10 stores a liquid crystal indicator 16 (third indicator) and a fluorescent character display tube 17 (second indicator) is provided above the fuel meter 15b and the water temperature meter 15c. The fluorescent character display tube 17 is connected to a circuit board 18. The upper side cover 14 is secured by screws to the front side housing portion 11 so as to cover and protect the fluorescent character display tube 17 and the circuit board 18. The front side housing portion 11 has an opening 19 at a position opposing the fluorescent character display tube 17, and indication light L1 by the fluorescent character display tube 17 is transmitted through the opening 19 and projected upon a half mirror which will be described later. The front side housing portion 11 has a light shielding wall 11a between the indicating instruments 15 and the liquid crystal indicator 16.

Reference numeral 20 represents the half mirror (semi-transmitting reflection board), and the half mirror 20 is slanted and held between the front side housing portion 11 and the rear side housing portion 12. The transmittance of the half mirror 20 is about 50%. Indication light L2 by the liquid crystal indicator 16 is transmitted through the half mirror 20 and reaches the viewer. Meanwhile, the indication light L1 by the fluorescent character display tube 17 is reflected upon the half mirror 20 and reaches the viewer. The rear side cover 13 is engaged to the front side housing portion 11 and the rear side housing portion 12 by engaging pawls to prevent dust from coming into the housing 10.

The indicating instruments 15 have a character board 21 (display board), a cold cathode tube 22 (light source), an optical guiding member 23, a pointer 24, a stepping motor 25 (pointer driving means) and a circuit board 26. The character board 21 is produced by printing a substrate of translucent resin such as polycarbonate in black except for scales (indicator portion 27). The cold cathode tube 22 and optical guiding member 23 are provided at the back of the character board 21, and the indicator portion 27 is subjected to transmitted illumination by the light from the cold cathode tube 22. The pointer 24 is pivoted by the stepping motor 25 to point the indicator portion 27 in the character board 21. The light from the cold cathode tube 22 is guided by the optical guiding member 23 into the pointer 24, and the pointing portion 28 of the pointer 24 is illuminated.

Figure 2:
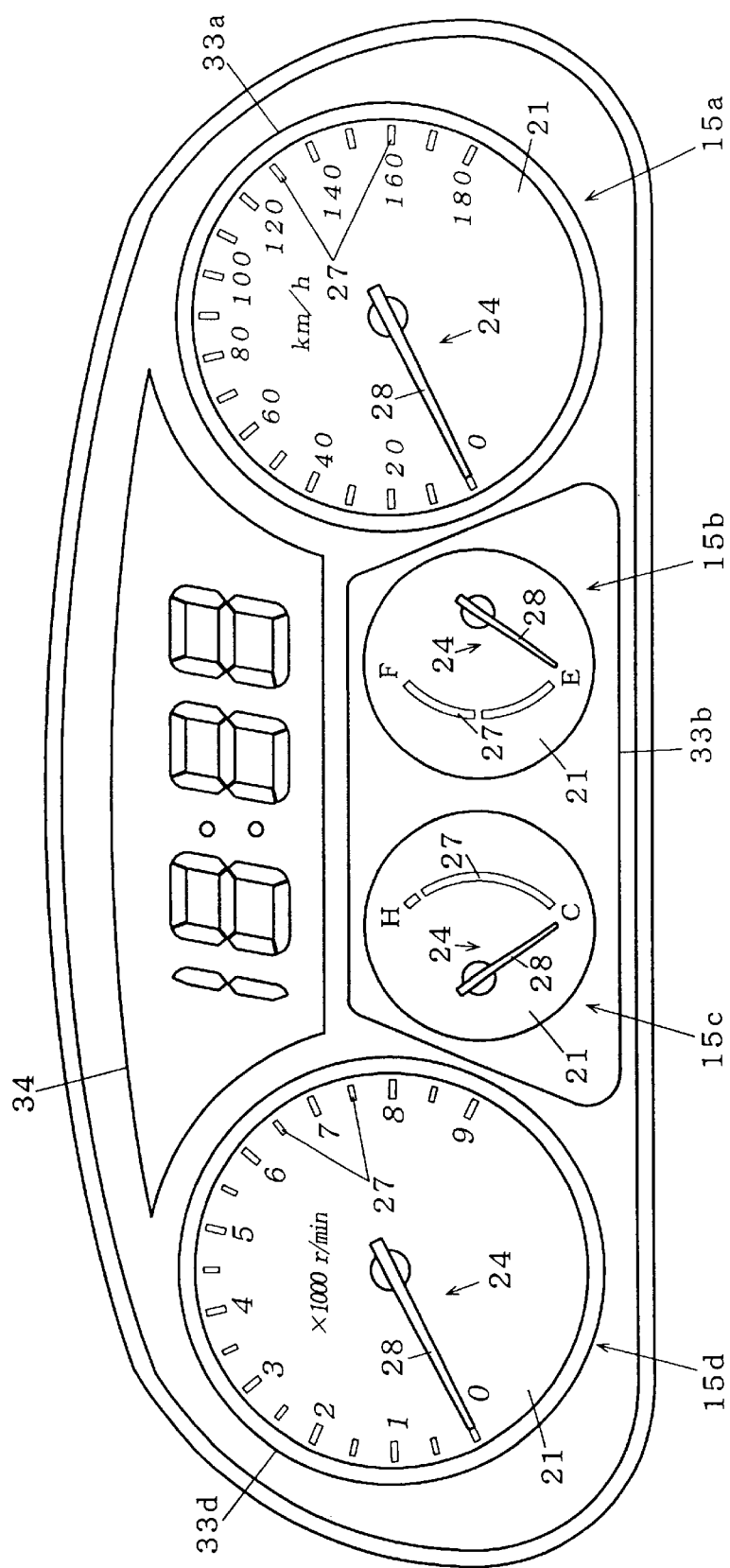
FIG. 2 is a front view of the embodiment.
Figure 3:
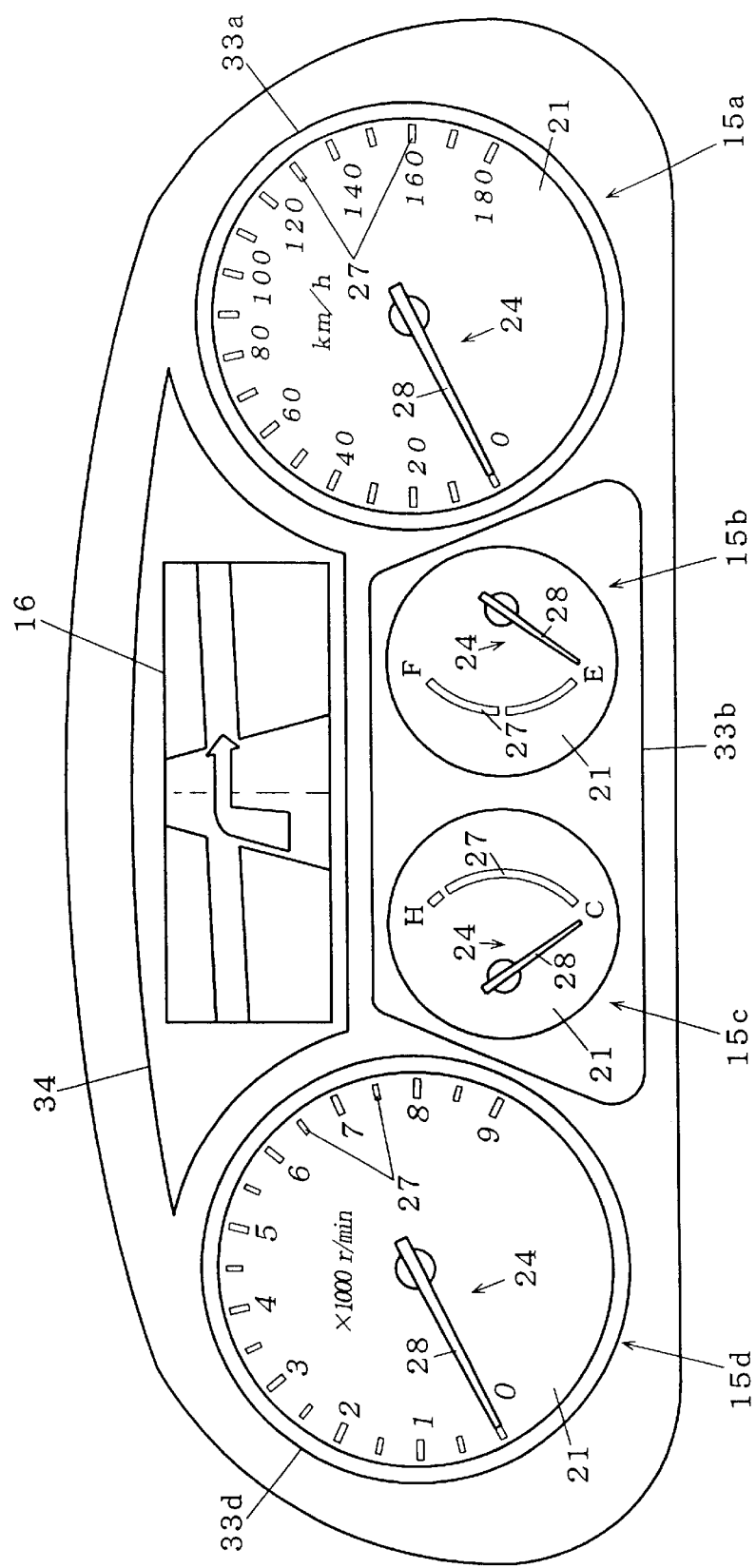
FIG. 3 is another front view of the embodiment.
Figure 4:
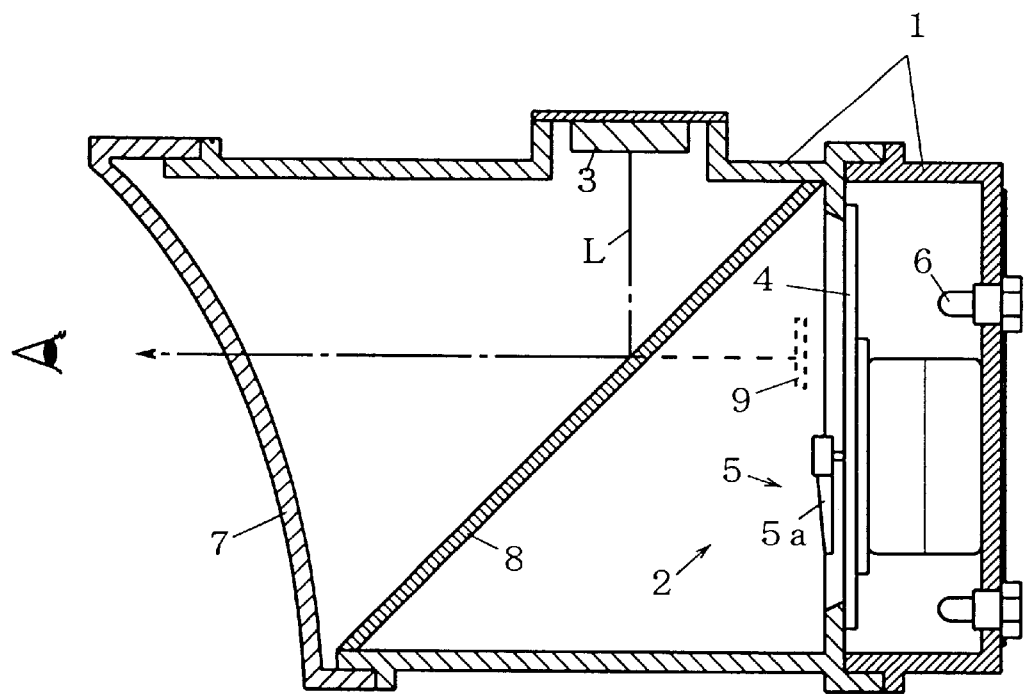
FIG. 4 is an exploded perspective view of a conventional display device.

The liquid crystal indicator 16 includes a TFT (Thin Film Transistor) type liquid crystal display element having an arrangement of a number of pixels, and a light source illuminating the liquid crystal display element from the back side and indicates navigation information or the like. The fluorescent character display tube 17 has a plurality of light emitting segments to indicate the time. The liquid crystal indicator 16 is normally in a non-indication state, and the time is indicated in a virtual image by the fluorescent character display tube 17 (see FIG. 2). The user may switch the indication with the operation switch to turn off the fluorescent character display tube 17 and indicate the route guiding information by the liquid crystal indicator 16 (see FIG. 3).

Reference numeral 29 represents a protection cover (cover) which is engaged to the front side of the front side housing portion 11 by an engaging pawl. The protection cover 29 is formed of a frame member 30, a first see-through plate 31 (first see-through portion) and a second see-through plate 32 (second see-through portion). The frame member 30 has first and second openings 33 and 34 at the positions corresponding to the indicating instruments 15 and the liquid crystal indicator 16, respectively. The first and second openings 33 and 34 are attached with the first and second see-through plates 31 and 32, respectively by welding.

The frame member 30 is formed of opaque resin such as polypropylene, while the first and second see-through plates 31 and 32 are formed of translucent resin such as polycarbonate. The first and second see-through plates 31 and 32 have a transmittance of about 20%. The first and second see-through plates 31 and 32 are in a curved shape and raised on the side of the liquid crystal indicator 16.

The first indication light L1 projected by the fluorescent character display tube 17 is reflected by the half mirror 20, passed through the second see-through plate 32 and let out from the housing 10. The second indication light L2 projected by the liquid crystal indicator 16 is passed through the half mirror 20 and the second see-through plate 32 and let out from the housing 10. Light from the indicating instruments 15 is passed through the first see-through plate 31 without being transmitted through the half mirror 20 and let out from the housing 10.

That is the viewer sees the fluorescent character display tube 17 reflected upon the semi-transmitting reflection board 20 through the second see-through plate 32. The viewer also sees the liquid crystal indicator 16 through the second see-through plate 32 and the semi-transmitting board 20. The viewer also sees the indicating instrument 15 through the first see-through plate 31 not through the semi-transmitting reflection board 20.

Light from the indicating instruments 15 (light from the pointing portion 28 and the indicator portion at the display board 21) is not passed through the half mirror 20, and therefore will not be reduced by the half mirror 20, so that the light may be viewed with 20% of the emitted light brightness (about twice that of the conventional device).

The protection cover 29 is formed of the frame member 30, the first and second see-through plates 31 and 32, and therefore the transmittance of the first and second see-through plates 31 and 32 may be selected as desired so that the brightness of the indicating instruments 15 and the fluorescent character display tube 17 may be well balanced. More specifically, the brightness of the indicating instruments 15 is about twice that of the conventional device, and the time indication by the fluorescent character display tube 17 looks relatively dark. Therefore, desirably, the transmittance of the first see-through plate 31 (first transmittance) for example is set to about 20%, and the transmittance of the second see-through plate 32 (second transmittance) is set to about 30%, so that the brightness of the indicating instruments 15 and the liquid crystal indicator 16 may be balanced well.

It should be noted that the embodiment includes the indicating instruments 15 (first indicators), the fluorescent character display tube 17 (second indicator) and the liquid crystal indicator 16 (third indicator), but the third indicator may be omitted. The display device may include the indicating instruments 15 (first indicators) and the fluorescent character display tube 17 (second indicator) and the reflection board may be a total reflection mirror.

In addition, the pointer driving means according to the present embodiment is the stepping motor 25, but cross coil type movement for example may be employed. The protection cover 29 is produced by attaching the first and second see-through plates 31 and 32 to the frame member 30 by welding, but the protection cover may be produced by integrally forming the opaque portion and the first and second see-through portions. The first indicators are the indicating instruments 15 according to the present embodiment, but the indicators may have a light source such as a light emitting diode and a bulb at the back of a display board for remaining fuel warning, seatbelt warning or the like.

INDUSTRIAL APPLICABILITY

The present invention may be applied to a display device indicating a virtual image, particularly preferably applied to a display device for vehicle.

What is claimed is:

1. A display device projecting indication light upon a reflection board to indicate a virtual image, comprising:
   a first indicator having a display board and a light source to subject said display board to transmitted illumination, said display board being peripherally spaced away from said reflection board so as to prevent overlap between said display board and reflection board with respect to the line of sight of a viewer;
   a second indicator having a light emitting type indicator to project said indication light;
   said reflection board to reflect said indication light; and
   a housing storing said first and second indicators and said reflection board, wherein said housing has a light shielding wall provided between said first and second indicators.

2. A display device, comprising,
   a first indicator having a display board and a light source to subject said display board to transmitted illumination;
   a second indicator having a light emitting type indicator to project indication light;
   a half-mirror to reflect said indication light; and
   a housing to store said first and second indicators and said half-mirror, wherein said housing has a light shielding wall provided between said first and second indicators,
   said indication light being reflected by said half-mirror to reach the viewer, light from said first indicator reaching the viewer without being passed through said half-mirror.

3. A display device, comprising:
a first indicator having a display board and a light source to subject said display board to transmitted illumination;
a second indicator having a first light emitting type indicator to project first indication light;
a third indicator having a second light emitting type indicator to project second indication light;
a semi-transmitting reflection board to reflect said first indication light and transmit said second indication light; and
a housing to store said first, second and third indicators and said semi-transmitting reflection board.

4. A display device, comprising:
a first indicator having a display board and a light source to subject said display board to transmitted illumination;
a second indicator having a first light emitting-type indicator to project first indication light;
a third indicator having a second light emitting type indicator to project second indication light;
a semi-transmitting reflection board to reflect said first indication light and transmit said second indication light; and
a housing to store said first, second and third indicators and said semi-transmitting reflection board,
said first indication light being reflected by said semi-transmitting reflection board to reach the viewer, said second indication light being passed through said semi-transmitting reflection board to reach the viewer, light from said first indicator reaching the viewer without being passed through said semi-transmitting reflection board.

5. The display device according to claim 1, wherein said first indicator is an indicating instrument including a pointer to point said display board and pointer driving means to drive said pointer.

6. The display device according to claim 1, further comprising:
a first see-through portion provided at a position corresponding to said first indicator and having a first transmittance;
a second see-through portion provided at a position corresponding to said second indicator and having a second transmittance; and
a cover provided at said housing.

7. The display device according to claim 1, wherein said display board is vertically spaced away from said reflection board.

8. The display device according to claim 1, wherein said display board is laterally spaced away from said reflection board.

9. A display device projecting indication light upon a reflection board to indicate a virtual image, comprising:
a first indicator having a display board and a light source to subject said display board to transmitted illumination, said display board being peripherally spaced away from said reflection board so as to prevent overlap between said display board and reflection board with respect to the line of sight of a viewer;
a second indicator having a light emitting type indicator to project said indication light;
said reflection board to reflect said indication light; and
a housing storing said first and second indicators and said reflection board, said display device further comprising a substantially horizontal light shielding wall positioned between said display board and said reflection board for preventing commingling of the indication light with light from the light source.

10. The display device according to claim 3, wherein said housing has a light shielding wall provided between said first indicator and at least one of said second and third indicators.

11. The display device according to claim 4, wherein said housing has a light shielding wall provided between said first indicator and at least one of said second and third indicators.

12. The display device according to claim 3, further comprising a substantially horizontal light shielding wall positioned between said display board and said reflection board for preventing commingling of at least one of the first and second indication lights with light from the light source.

13. The display device according to claim 4, further comprising a substantially horizontal light shielding wall positioned between said display board and said reflection board for preventing commingling of at least one of the first and second indication lights with light from the light source.

* * * * *